No. 728,973. PATENTED MAY 26, 1903.
E. F. PORTER.
ELECTRIC HEATER.
APPLICATION FILED FEB. 6, 1900.
NO MODEL. 2 SHEETS—SHEET 1.
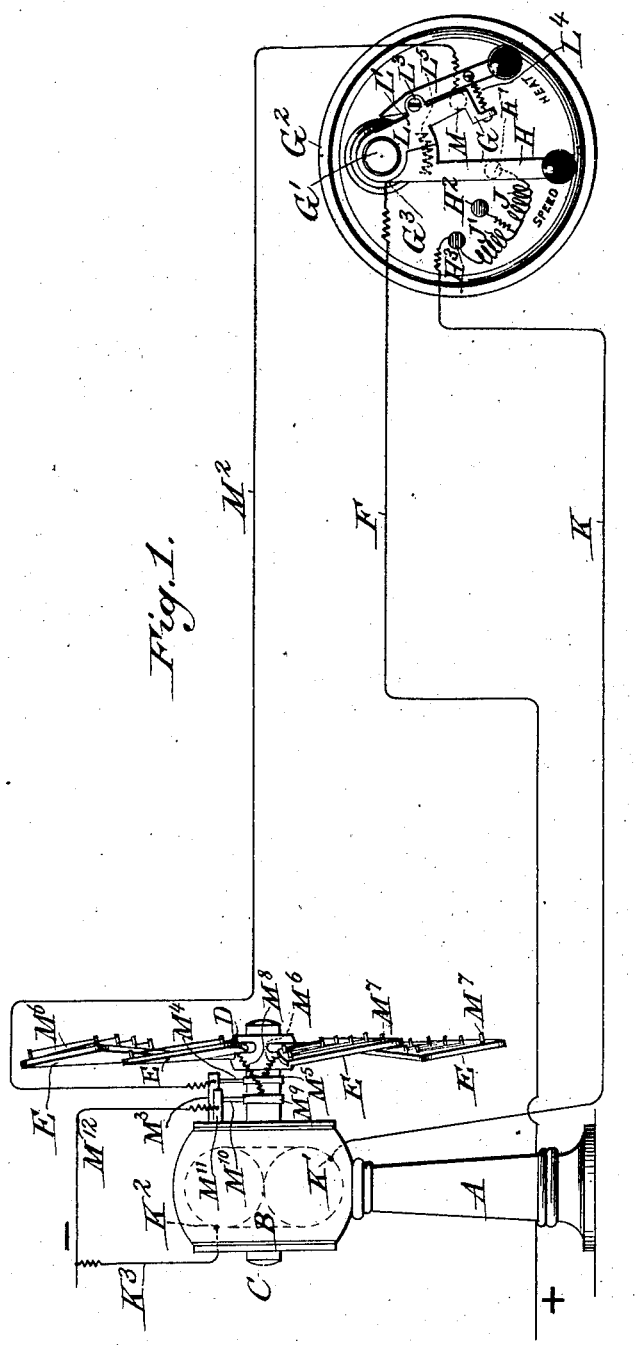
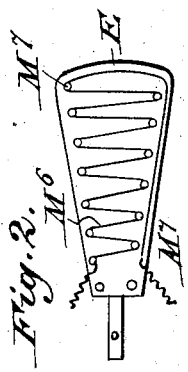

No. 728,973. PATENTED MAY 26, 1903.
E. F. PORTER.
ELECTRIC HEATER.
APPLICATION FILED FEB. 6, 1900.
NO MODEL. 2 SHEETS—SHEET 2.
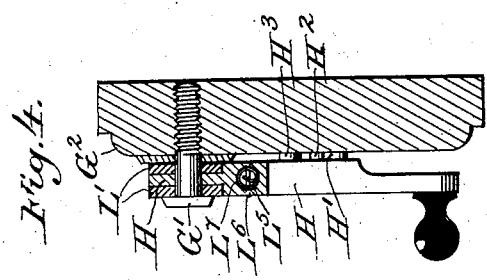
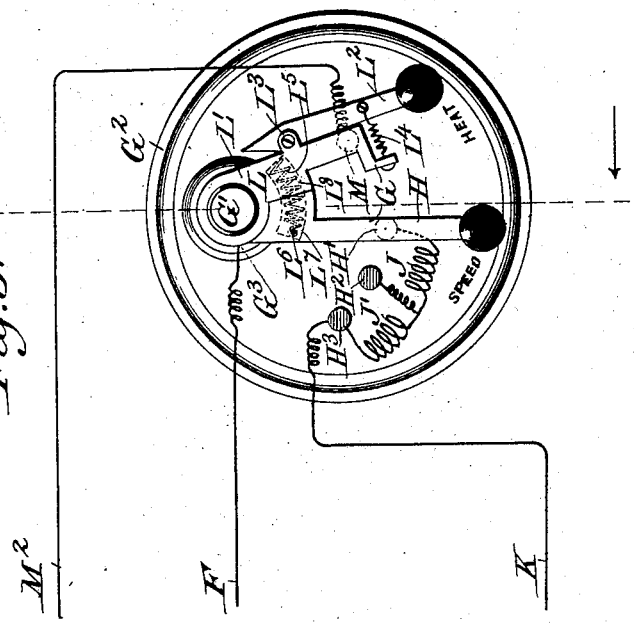
Witnesses
A. L. Weisert
C. A. Stewart
Inventor
Edwin F. Porter
By J S Rusk
Attorney No. 728,973. Patented May 26, 1903.

UNITED STATES PATENT OFFICE.

EDWIN F. PORTER, OF BOSTON, MASSACHUSETTS, ASSIGNOR TO THE BAY STATE ELECTRIC HEAT & LIGHT COMPANY, OF JERSEY CITY, NEW JERSEY, A CORPORATION OF NEW JERSEY.

ELECTRIC HEATER.

SPECIFICATION forming part of Letters Patent No. 728,973, dated May 26, 1903.

Application filed February 6, 1900. Serial No. 4,293. (No model.)

*To all whom it may concern:*

Be it known that I, EDWIN F. PORTER, of Boston, (Dorchester,) in the county of Suffolk and State of Massachusetts, have invented certain new and useful Improvements in Electric Heaters, of which the following is a specification.

My invention relates to improvements in electric heaters, and especially to switches where it is necessary to divide the electric current to establish one or more branch currents.

To illustrate the application of my invention, I have shown it as embodied in an electric-fan-heating apparatus such as is disclosed and claimed in United States patent to Mark W. Dewey, No. 449,404, dated March 31, 1891. In this fan-heating apparatus it will be seen that it is necessary to divide the electric current to carry one part to the blades for the purpose of heating them and the other part to the motor for the purpose of giving motion to the fan, which motion displaces or removes the heated air from the heating-surfaces.

The object of my invention is to render it impossible to stop the fan in its revolution without shutting off that part of the current which heats the resistance-wires on the blades, so that the fan becomes cool while it is standing still; and a further object is to start the fan at the moment the current is turned on to the heating resistances, so that it is impossible to heat the fan without setting it in motion.

The object of keeping the fan in motion while it is being heated is to prevent its destruction, which would be the case if it were standing still while being heated, as the air coming in contact with the resistances when the fan is revolving lowers the temperature of said resistances, the motion being thus a safeguard to prolong the life of the apparatus by removing the heated air rapidly from the surfaces.

In this application of my invention it will be understood that the two objects attained are, first, that the heat cannot be turned on without turning on the speed and the speed cannot be turned off without turning off the heat, and, further, that the variable speeds may be turned on and the fan used as a summer fan without turning on the heat at all, so that three different effects are produced in the manipulation of this switch.

My invention consists of certain novel features hereinafter described, and particularly pointed out in the claims.

In the accompanying drawings, which illustrate a construction embodying my invention, Figure 1 is a side elevation of an electric fan and a plan view of my improved switch for controlling the current which operates the motor and also controlling the current which heats the resistance on the blades. Fig. 2 is a detail view illustrating one of the fan-blades. Fig. 3 is an enlarged detail view showing a plan view of the switch. Fig. 4 is a transverse vertical sectional view through the switch.

Like letters of reference refer to like parts throughout the several views.

On the support A there is mounted a suitable electric motor B, having the usual shaft C, upon which is mounted the hub D, carrying the blades E, which constitute the revolving fan. Through the main electric conductor or wire F the electric current passes to the switch G, mounted on the insulating-pin G', projecting from the insulating base-plate $G^2$, and said wire F is connected to the switch G, as shown at the point $G^3$. Part of the current passes along the lever H to the contact-point H' (with the lever in the position shown in the drawings) and then through the resistances J and J' out through the branch electric conductor or wire K to the motor B at K' through the motor and out at $K^2$ through the wire $K^3$. It will be seen that the resistances J and J' may be cut out by placing the switch-lever H in contact successively with the pins $H^2$ and $H^3$, thereby varying the speed of the motor, as the less the resistance the greater the speed. The other branch of the current passes to the heater along the lever L, also pivoted on the insulating-pin G', to the contact-point M, and on through the branch electric conductor or wire $M^2$ to the brush-holder $M^3$ and then through the brush $M^4$ to the collector-ring $M^5$, on through the wire $M^6$, which is continued on the face of the blade and held by insulating-pins $M^7$, (see Fig. 2), the wire forming the heating resistance, as shown and described in the Dewey patent, above referred to, and the current after heating the resistances, which are in series, finally passes through the wire $M^8$ from the last blade to the other collector-ring $M^9$, to the brush $M^{10}$, to the brush-holder $M^{11}$, and out through the wire $M^{12}$. The motion of the fan displaces or removes the heated air from the heating-surfaces. The lever L is joined at $L^3$, and when the section $L^2$ is moved by the operator for the purpose of breaking the circuit said motion elongates the spring $L^4$, causing the section L' to make a quick break with the contact-point M. When the lever G is moved to break the circuit at H', it is necessary to also break the circuit at the contact-point M. This must necessarily be a quick break, and it is effected by the lever H compressing the spring $L^5$, which spring, when the section L' of the lever L leaves the contact-point, throws said lever quickly clear toward the right of the drawing and breaks the heater-circuit at this point M and at the same time the speed-circuit is broken by the movement to the right of the lever H. When both circuits are broken and the lever H is moved to the left for the purpose of establishing the circuit through the motor, the lever L is not moved, as the spring $L^5$ is secured only to the lever H by the pin $L^6$ in the socket $L^7$, the other end working loosely in a socket $L^8$ in the section L' of the lever L. The lever H may then be advanced over the several points of resistance to vary the speed of the motor, the heating-switch remaining in its open position, as it is not connected to the lever H. Starting again with both levers in their open position and moving the lever only to the left, it will be seen that when contact is made at the point M contact will simultaneously be made at the point H' by virtue of the contact, respectively, between said points M and H' and the levers L and H. The lever H will not be thrown beyond the point H', because the friction at said point is greater than the force of the spring $L^5$. In the reverse motion when the lever H is moved to the right the lever L, because of its friction with the point M, is not thrown out of contact by the spring, but by the actual contact of the two levers when after said friction is overcome at the point M the spring throws the lever clear. Briefly, in other words, when both circuits are broken and it is desired to heat the apartment the lever L is moved to close the circuit through the point M to the heater, and the lever H is moved to the left to close the circuit through the point H' to the motor, and, further, the lever H cannot be moved to the right without at the same time moving the lever L to the right. The heating resistances or conductors which form the electric heater instead of being mounted on the fan-blades, as shown in the drawings, may be located on a suitable disk adjacent to the fan, as shown in Fig. 8 of the Dewey patent, above mentioned, and the operation would be the same as previously described for a heater located directly on the fan-blades.

I do not limit myself to the arrangement and construction shown, as the same may be varied without departing from the spirit of my invention.

Having thus ascertained the nature of my invention and set forth a construction embodying the same, what I claim as new, and desire to secure by Letters Patent of the United States, is—

1. In an apparatus of the character specified, one or more heat-developing electric conductors forming an electric heater, an electric circuit including said heater, movable means for displacing or removing the heat from said heater, a motor for operating said movable means, an electric circuit including said motor, and a switch consisting of two sections one of which is adapted to make and break the motor-circuit and to operate the other section when moved in one direction to break the heater-circuit and to operate independently of the other when moved in the other direction.

2. In an apparatus of the character specified, one or more heat-developing electric conductors forming an electric heater, an electric circuit including said heater, movable means for displacing or removing the heat from said heater, a motor for operating said movable means, an electric circuit including said motor, a switch for controlling the heater-circuit, and a switch for controlling the motor-circuit adapted to operate the heater-circuit switch to break the heater-circuit when operated to break the motor-circuit and to be moved independently of the heater-circuit switch to close the motor-circuit.

3. In an apparatus of the character specified, one or more heat-developing electric conductors forming an electric heater, an electric circuit including said heater, a fan for displacing or removing the heat from said heater, a motor for operating the fan, an electric circuit including said motor, a switch for controlling the heater-circuit, and a switch for controlling the motor-circuit adapted to operate the heater-circuit switch to break the heater-circuit when operated to break the motor-circuit and to be moved independently of the heater-circuit to close the motor-circuit.

4. In an apparatus of the character specified, one or more heat-developing electrical conductors forming an electric heater, an electric circuit including said heater, a fan for displacing or removing the heat from said heater, a motor for operating said fan, an electrical circuit including said motor, a switch for controlling the motor-circuit, and a switch for controlling the heater-circuit adapted to operate the motor-circuit switch to close the motor-circuit when moved to close the heater-circuit and to be moved independently of the motor-controlling switch to break the heater-circuit.

5. In an apparatus of the character specified, an electric heater, movable means for displacing or removing the heat from said heater, a motor for operating said movable means, an electric conductor connected to said heater and forming the heater-circuit, an electric conductor connected to said motor and forming the motor-circuit, a switch for controlling the motor-circuit, and a switch for controlling the heater-circuit adapted to operate the motor-circuit switch to close the motor-circuit when moved to close the heater-circuit and to be moved independently of the motor-controlling switch to break the heater-circuit.

6. In an apparatus of the character specified, an electric heater, movable means for displacing or removing the heat from said heater, a motor for operating said movable means, an electric conductor connected to said heater and forming the heater-circuit, an electric conductor connected to said motor and forming the motor-circuit, a switch for controlling the heater-circuit, and a switch for controlling the motor-circuit adapted to operate the heater-circuit switch to break the heater-circuit when moved to break the motor-circuit and to be moved independently of the heater-circuit switch to close the motor-circuit.

7. In an apparatus, of the character specified, one or more heat-developing electric conductors forming an electric heater, an electric circuit including said heater, a fan for displacing or removing the heat from said heater, a motor for operating said fan, a circuit including said motor, a switch for controlling the heater-circuit adapted to operate the motor-circuit switch to close the motor-circuit when moved to close the heater-circuit and to be moved independently of the motor-controlling switch to break the heater-circuit, and a switch for controlling the motor-circuit adapted to operate the heater-circuit switch to break the heater-circuit when operated to break the motor-circuit and to be moved independently of the heater-circuit switch to close the motor-circuit.

8. In an apparatus of the class specified, one or more heat-developing electric conductors forming an electric heater, movable means for displacing or removing the heat from said heater, a motor for operating said movable means, an electric circuit divided into two branches respectively including said heater and said motor, and a switch controlling said circuit operating to close the branch circuit including the motor when moved to close the branch circuit including the heater.

9. In an apparatus of the class specified, one or more heat-developing electric conductors forming an electric heater, movable means for displacing or removing the heat from said heater, a motor for operating said movable means, an electric circuit divided into two branches respectively including said heater and said motor, and a switch controlling said circuit operating to break the branch circuit including the heater when moved to break the branch circuit including the motor.

10. In an apparatus of the class specified, one or more heat-developing electric conductors forming an electric heater, movable means for displacing or removing the heat from said heater, a motor for operating said movable means, an electric circuit divided into two branches respectively including said heater and said motor, and a switch controlling said circuit and operating to close the branch circuit including the motor independently of the branch circuit including the heater.

11. In an apparatus of the class specified, one or more heat-developing electric conductors forming an electric heater, movable means for displacing or removing the heat from said heater, a motor for operating said movable means, an electric circuit divided into two branches respectively including said heater and said motor, and a switch controlling said circuit and operating to break the branch circuit including the heater independently of the branch circuit including the motor.

12. In an apparatus of the class specified, one or more heat-developing electric conductors forming an electric heater, movable means for displacing or removing the heat from said heater, a motor for operating said movable means, an electric circuit divided into two branches respectively including said heater and said motor, and a switch controlling said circuit and operating to close the branch circuit including the motor when moved to close the branch circuit including the heater, or to break the circuit including the heater when moved to break the branch circuit including the motor, or to make or break the branch circuit including the motor independently of the branch circuit including the heater.

In testimony whereof I have signed my name to this specification, in the presence of two subscribing witnesses, this 31st day of January, A. D. 1900.

EDWIN F. PORTER.

Witnesses:
A. L. MESSER,
C. A. STEWART.